United States Patent
Roth

(10) Patent No.: US 8,474,388 B2
(45) Date of Patent: Jul. 2, 2013

(54) TWO-SIDED SINGLE-NEEDLE UNDERSTITCH SEWING TECHNIQUE

(75) Inventor: Alexander Roth, Griesheim (DE)

(73) Assignee: Evonik Roehm GmbH, Darmstadt (DE)

(*) Notice: Subject to any disclaimer, the term of this patent is extended or adjusted under 35 U.S.C. 154(b) by 317 days.

(21) Appl. No.: 12/738,643

(22) PCT Filed: Aug. 18, 2008

(86) PCT No.: PCT/EP2008/060782
§ 371 (c)(1),
(2), (4) Date: Apr. 23, 2010

(87) PCT Pub. No.: WO2009/053129
PCT Pub. Date: Apr. 30, 2009

(65) Prior Publication Data
US 2010/0209658 A1    Aug. 19, 2010

(30) Foreign Application Priority Data
Oct. 25, 2007  (DE) .................. 10 2007 051 422

(51) Int. Cl.
*D05B 3/02*  (2006.01)
*B32B 9/00*  (2006.01)

(52) U.S. Cl.
USPC .............. 112/475.08; 112/475.17; 428/102

(58) Field of Classification Search
USPC ............... 112/415, 438, 98, 116, 165, 197, 112/475.01–475.17; 428/99, 102, 104, 120
See application file for complete search history.

(56) References Cited

U.S. PATENT DOCUMENTS

| | | | | |
|---|---|---|---|---|
| 872,152 | A | * | 11/1907 | Schroeder ............... 112/98 |
| 3,207,107 | A | * | 9/1965 | Ferre ..................... 112/170 |
| 3,421,465 | A | * | 1/1969 | Higgs, Jr. et al. ....... 112/286 |
| 4,026,129 | A | * | 5/1977 | Sternlieb ................. 66/192 |
| 5,624,622 | A | | 4/1997 | Boyce et al. |
| 5,887,532 | A | * | 3/1999 | Hollenstein et al. ...... 112/21 |
| 6,051,089 | A | * | 4/2000 | Palmer et al. ............ 156/92 |
| 6,187,411 | B1 | | 2/2001 | Palmer |
| 7,475,647 | B2 | * | 1/2009 | Weinberg et al. ........ 112/221 |
| 2002/0160146 | A1 | | 10/2002 | Homma et al. |
| 2008/0226876 | A1 | | 9/2008 | Roth |

FOREIGN PATENT DOCUMENTS

| DE | 10 2005 024 408 | 11/2006 |
|---|---|---|
| EP | 1 174 533 | 1/2002 |
| WO | 2007 012353 | 2/2007 |

OTHER PUBLICATIONS

International Search Report issued Dec. 8, 2008 in PCT/EP08/60782 filed Aug. 18, 2008.

* cited by examiner

*Primary Examiner* — Ismael Izaguirre
(74) *Attorney, Agent, or Firm* — Oblon, Spivak, McClelland, Maier & Neustadt, L.L.P.

(57) ABSTRACT

Reinforcement of sandwich structures with aid of a reinforcing device. The outer layers of the sandwich structure may primarily include a fiber-plastic composite and the core material may include a rigid polymer foam.

18 Claims, 2 Drawing Sheets

TWO-SIDED SINGLE-NEEDLE UNDERSTITCH SEWING TECHNIQUE

TECHNICAL FIELD OF THE INVENTION

The invention relates to a reinforcing process for sandwich structures, characterized in that the introduction of a through-hole in the core material is carried out at a different time than the introduction of the reinforcing structure.

The invention is suitable for reinforcing sandwich structures. The sandwich structure may preferably comprise a fibre-plastic composite with outer layers of semifinished textile materials (for example woven or laid fabrics, mats, etc.), a core material (for example polymer foam) and a polymeric matrix material (thermoplastic or thermosetting material). Sandwich structures are structures that are built up layer by layer and comprise relatively thin upper and lower outer layers and a relatively thick core layer of low apparent density.

By means of this invention, the transversal properties (for example compressive or tensile rigidity and strength in the z direction, shear rigidity and strength in the xz and yz planes, peel resistance between the outer layer and the core, failsafe behaviour) and mechanical properties of sandwich structures in the direction of the plane of the sheet (for example rigidity and strength) can be increased significantly with the aid of reinforcing elements that traverse the thickness.

PRIOR ART

The principle of optimized density distribution in structural foam or in heavy-duty, lightweight composite materials is realized for example in sandwich panels comprising a shear-resistant lamination of a foam core with tension-resistant outer layers on both sides. There are many possible ways of producing a durable laminate bond. For example, adhesion or reinforcement may be used, depending on the loading. Reinforcement is the strengthening of an object by another of a higher compressive or tensile strength.

All previously known production methods for reinforcing sandwich structures in the direction of their thickness, such as for example the double lock-stitch, blind-stitch or two-needle sewing technique and the tufting method, have the common feature that the reinforcing elements (for example sewing threads, rovings) are introduced into the sandwich structure together with the needle. In the case of conventional textile-like stitched materials, the insertion of the needle including the sewing thread and the subsequent pulling out of the sewing needle and leaving behind of the sewing thread in the sewing hole generally do not present a problem on account of the resilient effect of the textiles. However, in the case of sandwich structures with a rigid polymer foam as the core material, the insertion of the needle including the sewing thread causes the cellular structure to be destroyed and the rigid polymer foam to be deformed to the approximate size of the sewing needle diameter as a result of plastic and elastic deformation. The drilling of a through-hole and subsequent leading of the thread through the drilled hole that is described in WO 2004/113063 leads to an unfavourable ratio of the surface area of the through-hole and the thread, and consequently a low thread volume content.

Once the sewing needle has been pulled out and the sewing thread left behind in the sewing hole, there is a reduction in the through-hole on account of the elastic deformation components of the cell walls, whereby the core hole diameter becomes smaller again than the sewing needle diameter. There is a virtually linear dependence between the diameter of the through-hole in the core that is obtained and the sewing needle diameter that is used, i.e. the greater the sewing needle diameter, the greater too the resultant through-hole in the core. Furthermore, the sewing thread causes additional widening of the core hole diameter. This additional widening corresponds approximately to the cross-sectional area of the sewing thread. It is also the case here that, the greater the cross-sectional area of the sewing thread used, the greater the additional widening.

U.S. Pat. No. 6,187,411 describes sewing by the two-sided sewing method, in which an upper thread is inserted into the layered structure with a needle from an outer layer of the sandwich structure and is held in the layered structure near the other outer layer by a lower thread. As a result, a loop is produced when the needle is withdrawn from the layered structure.

DE 102005024408 discloses a sewing method for reinforcing the materials in which, after producing a through-hole by means of a needle, the fibre bundles are pulled through the foam material and subsequently cut off flush or laid on the surface and optionally adhesively attached. This leads to the fibres slipping out from the outer layer during further processing, which reduces the interlaminar bond strength, but also to the undulation of the surface.

U.S. Pat. No. 5,624,622 discloses the reinforcing of a foam core sandwich structure by chain-stitch or lock-stitch sewing methods.

In the case of the previous sewing methods, when the needle is inserted, the thread is taken along with it. In this case, while the needle is being inserted into the foam, the thread extends parallel to the needle over the entire length. The size of the sewing hole is consequently determined by the needle diameter and the thickness of the thread.

After impregnation of the sandwich structure with the liquid matrix material and subsequent curing, the core hole diameter and the fibre volume content of the sewing thread in the core hole can be determined by means of microscopic examinations. Experimental examinations on sandwich structures stitched by means of double lock-stitch sewing technology and when using a sewing needle with a diameter of 1.2 mm and an aramid thread with a line weight of 62 g/km show here that the diameter of the resin column obtained in the core material (about 1.7 mm) is greater than the determined core hole diameter of a non-impregnated sandwich structure in the case of single insertion. The reason for this is that adjacent cell walls in the region of the sewing needle diameter are destroyed by the insertion of the sewing needle. In the subsequent infiltration process, resin can then penetrate into these then open pores with an average diameter of about 0.7 mm. See FIG. 2.

When the double lock-stitch sewing technique is used, with each insertion two sewing threads are always introduced in the z direction of the sandwich structure. In order to increase the sewing thread volume content within a through-hole, and consequently the reinforcing effect, already stitched places can be stitched once more or a number of times. However, sewing threads that are already in the core hole may be damaged by the renewed insertion of the sewing needle. With the aid of microscopic examinations, it can be established that the sewing thread volume content may not be increased in proportion to the number of insertions, as would be expected. The reason for this is that the diameter of the core hole does not remain constant as the number of insertions and the sewing threads introduced increase, since the core hole diameter is increased by the additional introduction of sewing threads by approximately the cross-sectional area of the threads. However, it is likewise established that the true curve profile only obeys this theory when there is a very high number of insertions. By contrast, when there is a small number of insertions, the diameter of the core hole increases to a disproportionately great extent. The reason for this is the positioning accuracy of the sewing machine. If a position which is to be stitched once again is moved to again, the sewing needle is not inserted precisely centrally into the already existing hole but a little to the side, within the limits of positioning accuracy, whereby the core hole is increased disproportionately. After insertion into the same core hole approximately eight times, the said hole has already been widened to such an extent that the sewing needle enters the existing hole without additional destruction of cell walls. With further insertions, widening only takes place as a result of the additional sewing threads that are introduced.

It is clear from these examinations that the diameter obtained in the polymeric core material when using conventional production methods (for example the double lock-stitch sewing technique) is mainly dependent on the sewing needle diameters used, the cross-sectional area of the sewing thread and the core diameter of the rigid polymer foam used. Since in the case of all the previously known reinforcing methods sewing needles and sewing threads are inserted simultaneously into the sandwich structure, there is always an unfavourable relationship between the cross-sectional area of reinforcing elements that is introduced and the size of the core hole diameter. High fibre volume contents in the core hole diameter, similarly high to the fibre volume content of the outer layers (>50%), consequently cannot be achieved with conventional reinforcing methods. Since, however, the mechanical properties are mainly influenced by the high-rigidity and high-strength reinforcing elements that are introduced, the aim must be to strive for a fibre volume content of the reinforcement in the core hole diameter that is as high as possible. Furthermore, the high resin component in the core hole diameter causes an increase in the weight, which in the aerospace sector in particular is not tolerated.

PROBLEM

The problem addressed by the invention is that of improving the mechanical properties of sandwich structures by incorporating reinforcing elements in the direction of the thickness of the sandwich structure (z direction), with a high fibre volume content of the reinforcement in the core hole diameter. The weight should not be adversely influenced too much by the incorporation of the reinforcing elements in the sandwich structure.

SOLUTION

This problem is solved by reinforcing sandwich structures in the following way
a) the introduction of a through-hole in the core material is carried out at a different time than the introduction of the reinforcing structure,
b) after the introduction of the through-hole, the reinforcing structure is fetched with the aid of a hook, gripper or needle and introduced into the sandwich structure by an upward and turning movement or an upward movement of a gripper, hook or needle secured to a slide,
c) after the introduction of the through-hole and the subsequent introduction of the reinforcing structure, the needle, the gripper or the hook is led to the next insertion hole in the sewing direction, with or without the slide (gripper system) and without or with simultaneous turning, whereupon, with the next insertion, the reinforcing structure slides past the needle, the hook or the gripper and, after passing through the core material, the reinforcing material is taken up on the underside, the upward and turning movement of the gripper, hook or needle or the upward movement of the gripper, hook or needle secured to a slide causing entwining between the upper-lying reinforcing structure and the under-lying reinforcing structure.

If a closable hook needle, for example with a flap or a slide, is used, it is possible to dispense with the turning movements.

This novel sewing technique may likewise be used for the preforming and fastening of additional structural components (for example stringers, frames, etc.) to the sandwich structure.

It has been found that, in comparison with DE102005024408A1, the sewing technique according to the invention allows the conventional operation of cutting to length to be omitted. Furthermore, it has been found that it is possible to prevent the displacement of the outer layer in subsequent processing steps, which has usually caused the pins to slip out from the outer layer. Apart from the lack of an interlaminar bond between the outer layer and the core layer, this then led to the rovings being laid in undefined directions. The resultant undulation of the outer layer can likewise be prevented by the method according to the invention.

With the method according to the invention, a positively and non-positively engaging bond is produced between the core material and the outer layer. An approximately 73% drop in the peel strength is measured if the reinforcing elements do not pass through the outer layers but end between the outer layer and the core layer.

Initial trials have shown that the drop in peel strength can be greatly reduced with the sandwich structures produced by the reinforcing process according to the invention.

The durable interlaminar bond of the outer layers with the core material also makes it possible for the composite component to be transported unproblematically.

The use of foams, felts or other laid fibre fabrics leads to improved properties with respect to thermal and/or acoustic insulation.

After the reinforcing process, the sandwich structure can be impregnated with a thermosetting or thermoplastic matrix material in a liquid composite moulding process.

According to the invention, sandwich structures are obtained.

These may comprise outer layers of semifinished textile materials and a core of polymeric, natural or structured core material, which are provided with reinforcing elements and possibly embedded in a polymeric matrix material.

DETAILED DESCRIPTION

Figure 1:
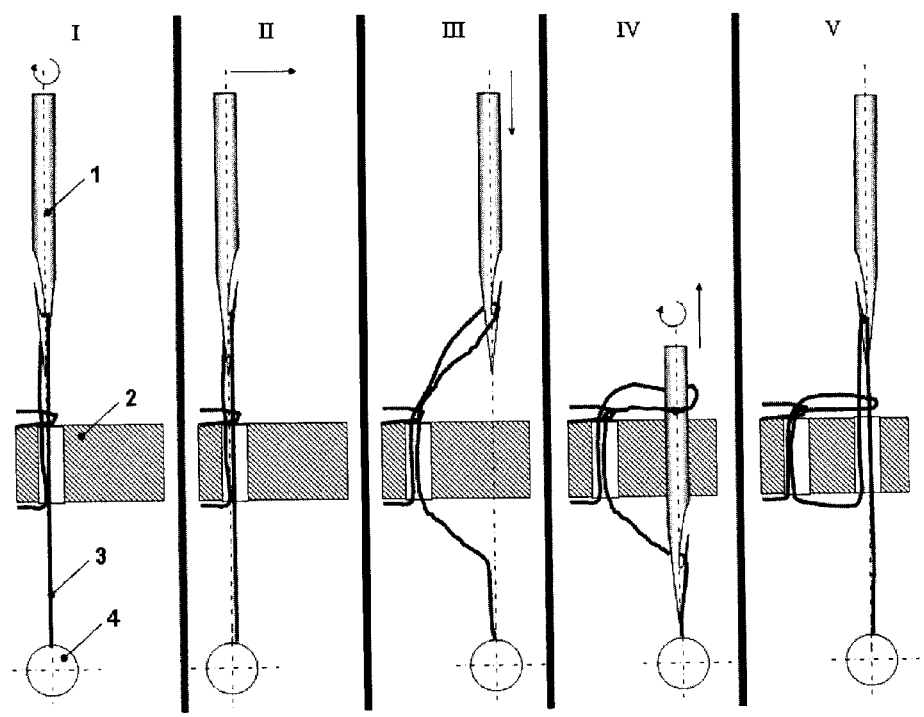
FIG. 1 illustrates the sewing process as disclosed herein.
Figure 2:
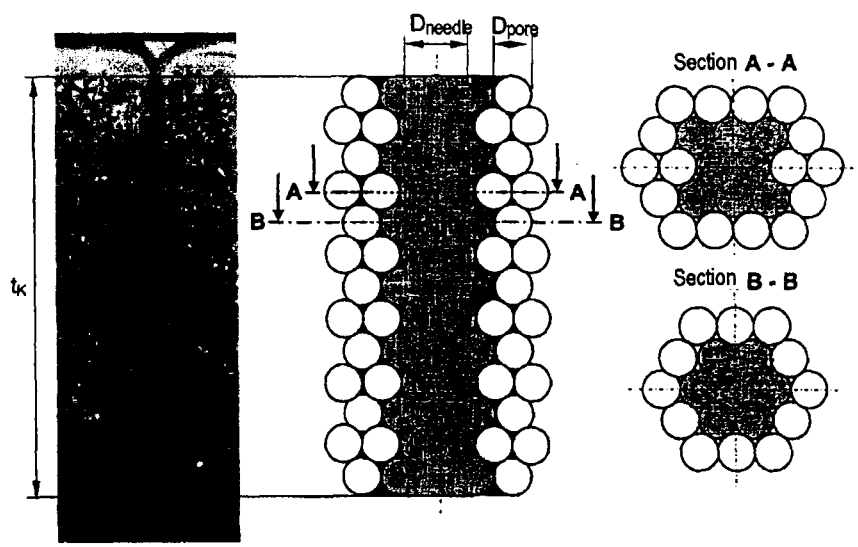
FIG. 2 illustrates a mechanism of the resin column produced using double lock-stitch sewing technology and dependence of the sewing thread volume content within a core hole on the number of sewing threads in the core hole.

In FIG. 1, a hook, gripper or needle (gripper system) (1) with the reinforcing material (3), such as sewing yarn or roving, is used for reinforcing sandwich structures. See Phase I in FIG. 1.

The hook, gripper or needle (1) with the reinforcing material (3) is led to the next insertion point with at the same time a turning movement through 180°. See Phases I and II in FIG.

1. If the hook, needle or gripper is secured to a slide, it is possible to dispense with the turning movement.

To introduce a through-hole, the hook, gripper or needle (1) is introduced into the core material (2) or possibly through one or more outer layers and the core material. See Phase III in FIG. 1. The reinforcing material is not taken along with it. The reinforcing material slides past the hole, needle or gripper, as seen in Phase IV in FIG. 1, and remains on the upper side of the core material.

The hook, needle or gripper fetches the reinforcing material on the underside and then subsequently introduces it into the sandwich structure by an upward and turning movement. See Phase IV in FIG. 1. If the hook, needle or gripper is secured to a slide, it is again possible to dispense with the turning movement during the upward movement.

Entwining of the reinforcing material, as seen in Phase V of FIG. 1, and consequently the formation of a knot, occurs on the upper side of the core material.

The hook, gripper or needle without a slide is led to the next insertion point in the sewing direction with a turning movement. See Phase I in FIG. 1. The hook, gripper or needle with a slide is led to the next insertion point in the same direction without a turning movement.

In the subsequent process step, the stitched material or the reinforcing unit is transported further to the next insertion position and the reinforcing process is then repeated there. Pulling in of the reinforcing structure can cause additional widening of the core hole diameter produced by the insertion of the gripper system, whereby a high fibre volume content can be realized. Since the reinforcing elements are introduced by pulling them into the sandwich structure or only into the core material, there is very good alignment and no buckling of the reinforcing structure. With the aid of this reinforcing method, the reinforcing elements introduced can likewise have an angle other than 0° in relation to the z axis, for example +/−45° if they are subjected to transverse force alone. The through-holes can be introduced into the foam in any desired angular position. The orientation of the through-holes can particularly be adapted individually to the respective form of the foam material to be reinforced and the load situation expected during use.

A rigid polymer material (for example PMI, PVC, PEI, PU, EPP, PES, PS, etc.) may be used as the core material.

However, other foam materials that are usually used as core material may also be used. Similarly, felts and other laid fibre fabrics may be used. The core material may have a thickness of for example 1 to 150 mm, a width of about 1250 mm and a length of about 2500 mm. The upper and lower textile outer layers may be constructed identically or differently and comprise polyamide, polyester, carbon, glass, nylon, metal, aramid or basalt fibres or other reinforcing materials. The thickness of an individual textile outer layer may be identical or different and lie for example between 0.1 mm and 5.0 mm. Thermoplastic or thermosetting materials may be used as polymer matrix material.

The reinforcing structure may comprise both textile reinforcing structures (for example sewing threads, rovings) or rod-shaped elements (for example pins of a unidirectional fibre-plastic composite, unreinforced plastic or metal, etc.).

Furthermore, fibre bundles are understood as meaning rovings comprising a multiplicity of individual fibres or monofilaments, individual fibres themselves and threads produced by entwining individual fibres or fibre bundles. Typical diameters of the reinforcing structure may be 0.1 mm to 2.0 mm.

For a good interlaminar bond of the reinforcement and the core material, the core material or the entire sandwich system may be infiltrated with resins. For this purpose, a vacuum is advantageously applied to one side of the core material or the sandwich system in order to suck through a resin located on the other side.

The amount of resin introduced should be as little as possible in order to obtain an optimum strength-to-weight ratio. The optimization is obtained primarily by reducing the amount of resin while simultaneously increasing the proportional fibre content per insertion hole.

The use of sandwich structures reinforced in the direction of their thickness as provided by the invention can find applications in the transport sector, such as for example aerospace, motor-vehicle and rail-vehicle construction as well as shipbuilding, but also in the area of sport and medicine as well as in the construction industry or the furniture industry. For example, parts of the control surfaces or fuselages of aircraft or helicopters, but also parts of the lining or interior fittings and fixtures, may be provided with the sandwich components produced according to the invention. Structural elements for interior or exterior construction work or for construction work at trade fairs may also be produced with the sandwich structures according to the invention.

LIST OF DESIGNATIONS

| Number | Designation |
| --- | --- |
| 1 | Gripper system (gripper, needle, hook) |
| 2 | Core material |
| 3 | Reinforcing material |
| 4 | Store for reinforcing material |

The invention claimed is:

1. A reinforcing process for a sandwich structure, comprising:

providing a core material of the sandwich structure including applying an outer layer of semi-finished textile material to a side of the core material, the semi-finished textile material being selected from the group consisting of polyamide fibers, polyester fibers, carbon fibers, glass fibers, nylon fibers, metal fibers, aramid fibers, and basalt fibers;

introducing a through-hole in the core material of the sandwich structure;

introducing a reinforcing structure at a time different from a time of introducing the through-hole;

after the introducing the through-hole, fetching the reinforcing structure with aid of a hook, a gripper, or a needle, and introducing the reinforcing structure into the sandwich structure by an upward and turning movement of the hook, the gripper, or the needle, or by an upward movement of the hook, the gripper, or the needle secured to a slide; and after the introducing the through-hole and the subsequent introducing the reinforcing structure, leading the needle, the gripper, or the hook to a next insertion hole in a sewing direction, with or without the slide and without or with simultaneous turning, whereupon, with a next insertion, the reinforcing structure slides past the needle, the hook, or the gripper, and, after passing through the core material, the reinforcing material is taken up on an underside of the sandwich structure, the upward and turning movement of the gripper, the hook, or the needle or the upward movement of the gripper, the hook, or the needle secured to the slide causing entwining between an upper-lying portion of the reinforcing structure and an under-lying portion of the reinforcing structure.

2. The reinforcing process according to claim 1, wherein the introducing the reinforcing structure includes providing textile reinforcing structures or rod-shaped elements.

3. The reinforcing process according to claim 2, wherein the introducing the reinforcing structure further includes providing sewing threads or rovings.

4. A sandwich structure, comprising:
a sandwich structure obtained by the process according to claim 1.

5. The sandwich structure according to claim 4, wherein the sandwich structure composes a portion of a spacecraft, an aircraft, an oceangoing craft, a land vehicle, or a rail vehicle.

6. The sandwich structure according to claim 4, wherein the sandwich structure composes a portion of sports equipment.

7. The sandwich structure according to claim 4, wherein the sandwich structure composes a portion of structural elements for interior or exterior construction work or structural elements for construction work at trade fairs.

8. A reinforcing process for a sandwich structure, comprising:
providing a core material of the sandwich structure;
introducing a through-hole in the core material of the sandwich structure;
introducing a reinforcing structure including providing pins of a unidirectional fiber-plastic composite, an unreinforced plastic, or a metal, the introducing the reinforcing structure occurring at a time different from a time of introducing the through-hole;
after the introducing the through-hole, fetching the reinforcing structure with aid of a hook, a gripper, or a needle, and introducing the reinforcing structure into the sandwich structure by an upward and turning movement of the hook, the gripper, or the needle, or by an upward movement of the hook, the gripper, or the needle secured to a slide;
after the introducing the through-hole and the subsequent introducing the reinforcing structure, leading the needle, the gripper, or the hook to a next insertion hole in a sewing direction, with or without the slide and without or with simultaneous turning, whereupon, with a next insertion, the reinforcing structure slides past the needle, the hook, or the gripper, and, after passing through the core material, the reinforcing material is taken up on an underside of the sandwich structure, the upward and turning movement of the gripper, the hook, or the needle or the upward movement of the gripper, the hook, or the needle secured to the slide causing entwining between an upper-lying reinforcing structure and an under-lying reinforcing structure,
wherein the introducing the reinforcing structure further includes providing textile reinforcing structures or rod-shaped elements.

9. The reinforcing process according to claim 8, further comprising:
providing outer layers of the sandwich structure including semi-finished textile materials; and
embedding the outer layers, the core material, and the reinforcing structure in a polymeric matrix material,
wherein the providing the core material includes providing a polymeric core material, a natural core material, or a structured core material.

10. The reinforcing process according to claim 9, wherein the introducing the reinforcing structure further includes providing sewing threads or rovings.

11. The reinforcing process according to claim 9, wherein the providing the core material includes applying an outer layer of semi-finished textile material to a side of the core material, the semi-finished textile material selected from the group consisting of polyamide fibers, polyester fibers, carbon fibers, glass fibers, nylon fibers, metal fibers, aramid fibers, and basalt fibers.

12. A sandwich structure, comprising:
the sandwich structure obtained by the process according to claim 8.

13. A reinforcing process for a sandwich structure, comprising:
providing outer layers of the sandwich structure including semi-finished textile materials;
providing a core material of the sandwich structure including a polymeric core material, a natural core material, or a structured core material;
introducing a through-hole in the core material of the sandwich structure;
introducing a reinforcing structure at a time different from a time of introducing the through-hole;
after the introducing the through-hole, fetching the reinforcing structure with aid of a hook, a gripper, or a needle, and introducing the reinforcing structure into the sandwich structure by an upward and turning movement of the hook, the gripper, or the needle, or by an upward movement of the hook, the gripper, or the needle secured to a slide;
after the introducing the through-hole and the subsequent introducing the reinforcing structure, leading the needle, the gripper, or the hook to a next insertion hole in a sewing direction, with or without the slide and without or with simultaneous turning, whereupon, with a next insertion, the reinforcing structure slides past the needle, the hook, or the gripper, and, after passing through the core material, the reinforcing material is taken up on an underside of the sandwich structure, the upward and turning movement of the gripper, the hook, or the needle or the upward movement of the gripper, the hook, or the needle secured to the slide causing entwining between an upper-lying reinforcing structure and an under-lying reinforcing structure; and
embedding the outer layers, the core material, and the reinforcing elements in a polymeric matrix material.

14. The reinforcing process according to claim 13, wherein the introducing the reinforcing structure includes providing textile reinforcing structures or rod-shaped elements.

15. The reinforcing process according to claim 14, wherein the introducing the reinforcing structure further includes providing sewing threads or rovings.

16. The reinforcing process for sandwich structures according to claim 15, wherein the introducing the reinforcing structure includes providing pins of a unidirectional fiber-plastic composite, an unreinforced plastic, or a metal.

17. The reinforcing process according to claim 14, wherein the providing the core material includes applying an outer layer of semi-finished textile material to a side of the core material, the semi-finished textile material selected from the group consisting of polyamide fibers, polyester fibers, carbon fibers, glass fibers, nylon fibers, metal fibers, aramid fibers, and basalt fibers.

18. A sandwich structure, comprising:
the sandwich structure obtained by the process according to claim 13.

* * * * *